United States Patent
Shaikh et al.

(10) Patent No.: US 6,376,098 B1
(45) Date of Patent: Apr. 23, 2002

(54) LOW-TEMPERATURE, HIGH-STRENGTH METAL-MATRIX COMPOSITE FOR RAPID-PROTOTYPING AND RAPID-TOOLING

(75) Inventors: Furqan Zafar Shaikh, Troy; Howard Douglas Blair, Romulus; Tsung-Yu Pan, Ypsilanti, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/432,047

(22) Filed: Nov. 1, 1999

(51) Int. Cl.⁷ .......................... C22C 49/14; C22C 49/02; C22C 47/04; C22C 47/12
(52) U.S. Cl. ...................... 428/614; 428/293.1; 164/97
(58) Field of Search ................... 428/614, 611, 428/608, 293.1; 164/97, 91

(56) References Cited

U.S. PATENT DOCUMENTS

| | | | | |
|---|---|---|---|---|
| 3,622,283 A | * | 11/1971 | Sara ............................ | 428/614 |
| 4,132,828 A | * | 1/1979 | Nakamura et al. ........... | 428/614 |
| 4,376,803 A | * | 3/1983 | Katzman ..................... | 428/408 |
| 4,661,403 A | * | 4/1987 | Morin ......................... | 428/367 |
| 4,831,707 A | * | 5/1989 | Goddard et al. ............ | 29/419.1 |
| 5,511,603 A | | 4/1996 | Brown et al. | |
| 5,702,542 A | | 12/1997 | Brown et al. | |

* cited by examiner

*Primary Examiner*—John J. Zimmerman
(74) *Attorney, Agent, or Firm*—Damian Porcari

(57) ABSTRACT

A metal matrix composite includes a plurality of fibers having an average diameter of about eight micrometers with a coating, and a metal or alloy distributed with said fibers, a fibers-to-metal or alloy ratio has a range is has a range of about 9:1 to less than about 1:1.

21 Claims, No Drawings

LOW-TEMPERATURE, HIGH-STRENGTH METAL-MATRIX COMPOSITE FOR RAPID-PROTOTYPING AND RAPID-TOOLING

TECHNICAL FIELD

The present invention relates generally to metal-matrix composites, and more particularly, to a metal-matrix composite suitable for rapid prototyping.

BACKGROUND

In the automotive industry, it is desirable to bring a product to market in a short amount of time. This reduces the overall cost of the vehicle. One manner in which automakers have reduced product development time is by using rapid prototyping and tooling methods such as stereolithography. Stereolithography or other rapid prototyping systems in conjunction with a computer aided design system can be used to form a prototype part based upon drawings generated by the CAD system.

One drawback to parts developed in known rapid prototyping systems is that the techniques use layers of paper and plastic or plastic powders to construct the parts. As a result, the part can only be used in low-temperature prototype environment. Also, additional processing must take place in order to make metal dies.

It would therefore be desirable to provide a rapid prototyping system that forms parts having a higher melting point than those known rapid prototyping systems. This allows the part to be used under higher temperature processing such as the formation of metal dies.

SUMMARY OF THE INVENTION

The present invention provides suitable metal-matrix composites for use in rapid prototyping systems. The metal-matrix composites have higher melting temperatures than materials used in prior known rapid prototyping systems.

In one aspect of the invention, a metal-matrix composite comprises a plurality of fibers having an average diameter of about eight micrometers with a coating, and a metal or alloy distributed with said fibers, a fibers-to-metal or alloy ratio by volume has a range is has a range of about 9:1 to less than about 1:1

In a further aspect of the invention, a method of forming a part includes the steps of forming a composite material by mixing a molten metal or alloy with a bundle of fibers; heating the composite material to a melting point of the composite material to from a molten material; dispensing the molten material at least at said melting point into a shape of a part; and solidifying the molten material.

One advantage of the invention is that by eliminating additional processing in prototypes, the cost and time of producing a product is reduced.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

The present invention is described with respect to a metal-matrix composite for use in a rapid prototyping system. However, the metal-matrix composite of the present invention may also be suitable for other applications both inside and outside of the automotive industry. For example, the aerospace industry may also benefit from the metal-matrix composite.

Metal-matrix composites are metals or alloys strengthened with tiny inclusions of another material which inhibit crack growth and increase performance. In the preferred embodiment, the metal is a Sn alloy reinforced with carbon fiber or fibers. The carbon fibers may be continuous or discrete fibers. The preferred aspect ratio of discrete fibers is greater than 10:1. Carbon fibers having a diameter of about eight micrometers have been used.

Preferably, the carbon fibers have a coating to increase wetability. The coatings may be formed from Ni, Au and/or In. The thickness of the coating preferably ranges from about 0.3 micrometers to 1.5 micrometers.

The metal-matrix is preferably a Sn alloy that has a melting temperature above 130° C. but below 300° C. The composition of the metal is preferably eutectic or near-eutectic. Alloys of Sn include the mixture of Ag, Sb, Cu, Zn, Bi. Fe, Co, In, Ni, or Pb. Preferred compositions include by weight Ag from 0 to 5%, Sb from 0 to 7%, Cu from 0 to 5%, Zn from 0 to 15%, Bi from 0 to 60%, In from 0 to 60%, Fe, Co, Ni from 0 to 1%, and Pb from 0 to 50%. Suitable compositions include Sn-3.5 Ag, Sn-5 Sb, Sn-0.7 Cu, Sn-9 Zn, Sn-58 Bi, or Sn-62 Pb. For many applications, however, the lead alloy may not be preferred due to its lead content. The ratio of fiber to metal by volume preferably extends from about nine to below one. However, the preferred range is between about nine and about seven.

A goal of the present invention is to have comparable, equal or better stiffness yield strength mechanical strength than pure aluminum and aluminum alloys. Pure aluminum has a tensile of 90 MPa. Sn alloy has a tensile strength of 30 MPa. A composite material formed according to the present invention using a continuous fiber and an alloy with 63% Sn and 37% Pb was formed having a tensile strength of 270 MPa. Using non-woven carbon fiber and the same alloy, a tensile strength of 95 MPa has been achieved.

Another desirable feature of the composite of the present invention is the melting temperature. Known rapid prototyping systems have processing temperatures around 280° C. The present invention has a melting temperature below a desired 250° C. One composite material had a melting temperature below 230° C. In contrast, aluminum and its alloys have a melting temperature near or above 600° C. so processing temperatures are typically above 650° C. To form the composite material, a capillary flow may be used to flow the molten metal alloy into the bundle of fibers. The molten metal flows into the gaps between the fibers to form the composite. Little or no pressure has to be used.

A flux may be used to first wet the fibers before applying the molten Sn alloy. The wetting process may be manual or may be performed by dipping the fibers into the flux material. An automatic system feeding the fiber into the flux bath then drawing them out is also contemplated. Another method for applying flux to the fibers is dispensing the metal flux directly onto the fibers. A squeegee may be used to remove excess molten material from the fiber bundle.

To form a rapid prototype part, the composite material is deposited into the desired shape by rapid prototyping system. Typically, such systems use an XYZ coordinate system for directing movement. The composite material of the present invention is particularly suitable for rapid prototyping because the composite material solidifies within seconds to form a solid structure.

Another manner for manufacturing the composite material is vacuum infiltration with pressurized molten Sn-based alloy.

While particular embodiments of the invention have been shown and described, numerous variations and alternate embodiments will occur to those skilled in the art. Accordingly, it is intended that the invention be limited only in terms of the appended claims.

What is claimed is:

1. A metal matrix composite suitable for rapid prototyping comprising:

a plurality of fibers having an average diameter of about eight micrometers, a coating substantially surrounding said plurality of fibers, and a metal or metal alloy distributed around said fibers and said coating, wherein the fibers-to-metal or fibers-to-metal alloy ratio of the metal matrix composite is between about 9:1 to about 3:1 by volume.

2. A metal matrix composite as recited in claim 1 wherein the metal matrix composite has a tensile strength between about 95 MPa and about 270 MPa.

3. A metal matrix composite as recited in claim 1 wherein the metal matrix composite has a melting temperature below about 280 degrees Celsius.

4. A metal matrix composite as recited in claim 1 wherein the metal matrix composite has a melting temperature between about 130 and about 280 degrees Celsius.

5. A metal matrix composite as recited in claim 1 wherein said coating is selected from the group of Ni, Au, and In.

6. A metal matrix composite as recited in claim 1 wherein said coating has a thickness from about 0.3 micrometers to about 1.5 micrometers.

7. A metal matrix composite as recited in claim 1 wherein each of said plurality of fibers has an aspect ratio of greater than about 10:1.

8. A metal matrix composite as recited in claim 1 wherein said metal alloy is an Sn alloy.

9. A metal matrix composite as recited in claim 8, wherein the alloying metal of said Sn alloy is selected from the group consisting of Ag, Sb, Cu, Zn, Bi, and Pb.

10. A metal matrix composite suitable for rapid prototyping comprising:

a plurality of carbon fibers having an average diameter of about 8 micrometers, a coating substantially surrounding said plurality of carbon fibers, and an Sn alloy distributed around said carbon fibers and said coating, said carbon fibers to Sn alloy ratio of the metal matrix composite is between about 9:1 to about 3:1 by volume.

11. A metal matrix composite as recited in claim 10 wherein the metal matrix composite has a melting temperature below about 280 degrees Celsius.

12. A metal matrix composite as recited in claim 10 wherein the metal matrix composite has a melting temperature between about 230 and about 280 degrees Celsius.

13. A metal matrix composite as recited in claim 10 wherein said coating is selected from the group of Ni, Au, and In.

14. metal matrix composite as recited in claim 10 wherein said coating has a thickness from about 0.3 micrometers to about 1.5 micrometers.

15. A metal matrix composite as recited in claim 10 wherein each of said plurality of carbon fibers has an aspect ratio of greater than about 10:1.

16. A metal matrix composite as recited in claim 10 wherein the alloying metal of said Sn alloy is selected from the group consisting of Ag, Sb, Cu, Zn, Bi, and Pb.

17. A method of forming a metal matrix composite part comprising:

coating a plurality of fibers with a coating to form a plurality of coated fibers;

placing said plurality of coated fibers within a cavity of a rapid prototyping machine, wherein said cavity has the shape of the desired composite part;

mixing a molten metal or molten metal alloy with said plurality of coated fibers within said rapid prototyping machine; and solidifying said molten metal or metal alloy around said plurality of coated fibers, wherein said fibers to metal or metal alloy ratio of the metal matrix composite is between about 9:1 to about 3:1 by volume.

18. A method of forming a part as recited in claim 17 wherein the step of mixing comprises capillary flowing a molten metal or molten metal alloy with said plurality of coated fibers within said rapid prototyping machine.

19. A method of forming a part as recited in claim 17 wherein the steps of mixing comprises pressurizing the molten metal or metal alloy to form a pressurized molten material and injecting said pressurized molten material into said rapid prototyping machine having said plurality of coated fibers.

20. A method of forming a part as recited in claim 17 wherein the step of solidifying takes less than about 5 seconds.

21. A method of forming a part as recited in claim 17 wherein prior to the step of forming, wetting a plurality of carbon fibers with a flux.

* * * * *